USO11458942B2

(12) United States Patent
Schulz et al.

(10) Patent No.: US 11,458,942 B2
(45) Date of Patent: Oct. 4, 2022

(54) SOLENOID VALVE, IN PARTICULAR FOR SLIP-CONTROLLED MOTOR-VEHICLE BRAKE SYSTEMS

(71) Applicant: Continental Teves AG & Co. oHG, Frankfurt am Main (DE)

(72) Inventors: Christian Schulz, Riedstadt (DE); Marc Lenz, Neu-Anspach (DE); Holger Kollmann, Rodgau (DE); Christian Courth, Frankfurt (DE)

(73) Assignee: Continental Teves AG & Co. oHG ( * ) Notice: Subject to any disclaimer, the term of this patent is extended or adjusted under 35 U.S.C. 154(b) by 0 days.

(21) Appl. No.: 16/331,165

(22) PCT Filed: Sep. 5, 2017

(86) PCT No.: PCT/EP2017/072148
§ 371 (c)(1),
(2) Date: Mar. 7, 2019

(87) PCT Pub. No.: WO2018/054674
PCT Pub. Date: Mar. 29, 2018

(65) Prior Publication Data
US 2019/0256067 A1 Aug. 22, 2019

(30) Foreign Application Priority Data

Sep. 23, 2016 (DE) .................... 10 2016 218 330.3
Jun. 7, 2017 (DE) .................... 10 2017 209 582.2

(51) Int. Cl.
B60T 8/36 (2006.01)
F16K 31/06 (2006.01)
F16K 47/04 (2006.01)

(52) U.S. Cl.
CPC .......... *B60T 8/363* (2013.01); *F16K 31/0675* (2013.01); *F16K 31/0682* (2013.01); *F16K 47/04* (2013.01)

(58) Field of Classification Search
CPC .......... B60T 8/363; B60T 13/686; F16K 1/32; F16K 31/0675; F16K 31/0682; F16K 47/04
See application file for complete search history.

(56) References Cited

U.S. PATENT DOCUMENTS 5,005,919 A * 4/1991 Shuey .................. B60T 8/3615
137/596.17
5,163,474 A * 11/1992 Rizk .................... B60T 8/3615
137/596.17

(Continued)

FOREIGN PATENT DOCUMENTS

CN 203442288 U 2/2014
DE 10046046 A1 8/2001

(Continued)

OTHER PUBLICATIONS

English translation of DE 102011087896A1 (Year: 2013).*

(Continued)

*Primary Examiner* — Robert A. Siconolfi
*Assistant Examiner* — Mahbubur Rashid
(74) *Attorney, Agent, or Firm* — RatnerPrestia

(57) ABSTRACT

An electromagnetic valve whose inlet and outlet ducts are oriented transversely with respect to the valve holding bore in the valve carrier, wherein the outlet duct opens out, at a distance from the discharge of the filter element, in a portion of the valve holding bore in which the filter element has a closed sleeve portion, in order to achieve a noise reduction through targeted diversion of the flow in the direction of the outlet duct.

8 Claims, 2 Drawing Sheets

(56) References Cited

U.S. PATENT DOCUMENTS

| | | | |
|---|---|---|---|
| 5,810,330 A * | 9/1998 | Eith | B60T 8/363 251/129.19 |
| 6,003,838 A * | 12/1999 | Beck | B60T 8/363 251/129.15 |
| 6,099,608 A | 8/2000 | Harms et al. | |
| 6,254,199 B1 * | 7/2001 | Megerle | B60T 8/363 137/550 |
| 6,318,703 B1 * | 11/2001 | Goossens | B60T 8/363 251/129.15 |
| 6,427,972 B1 * | 8/2002 | Kirschner | B60T 8/363 251/129.15 |
| 6,627,077 B2 * | 9/2003 | Fritsch | B60T 8/3615 137/545 |
| 6,637,724 B1 * | 10/2003 | Mayer | B60T 8/363 251/129.01 |
| 6,644,623 B1 * | 11/2003 | Voss | B60T 8/363 251/129.01 |
| 6,659,421 B1 * | 12/2003 | Goossens | B60T 8/363 251/129.02 |
| 6,846,049 B2 * | 1/2005 | Obersteiner | B60T 8/363 137/596.17 |
| 6,846,408 B2 * | 1/2005 | Knight | B60T 8/3615 137/550 |
| 7,325,563 B2 * | 2/2008 | Seko | F02M 25/0836 137/339 |
| 7,341,320 B2 * | 3/2008 | Otsuka | B60T 8/3615 303/119.2 |
| 8,127,788 B2 * | 3/2012 | Yamashita | F04B 17/05 137/315.03 |
| 8,132,779 B2 * | 3/2012 | Lee | F16K 31/0662 251/129.15 |
| 8,322,684 B2 * | 12/2012 | Otsuka | B60T 8/363 251/129.15 |
| 8,733,397 B2 * | 5/2014 | Otsuka | B60T 8/363 137/630.16 |
| 8,985,549 B2 * | 3/2015 | Ferguson | F16K 27/0245 251/30.03 |
| 9,016,660 B2 * | 4/2015 | Leventhal | F16K 31/0658 251/129.02 |
| 9,038,984 B2 * | 5/2015 | Voss | F16K 31/0658 251/30.04 |
| 9,090,236 B2 * | 7/2015 | Fricke-Schmidt | B60T 8/3615 |
| 9,457,784 B2 * | 10/2016 | Tokoi | B60T 15/028 |
| 2002/0074273 A1 * | 6/2002 | Golovatai-Schmidt | B01D 35/02 210/130 |
| 2002/0100890 A1 * | 8/2002 | Moreno | F15B 13/0821 251/129.15 |
| 2003/0213928 A1 * | 11/2003 | Masuda | F16K 31/0655 251/129.15 |
| 2004/0232763 A1 * | 11/2004 | Otsuka | B60T 8/363 303/119.2 |
| 2005/0173979 A1 | 8/2005 | Voss | |
| 2009/0095929 A1 * | 4/2009 | Lee | B60T 17/04 251/129.15 |
| 2010/0059698 A1 * | 3/2010 | Guggenmos | B60T 8/363 251/129.15 |
| 2013/0056662 A1 | 3/2013 | Otsuka et al. | |
| 2013/0092113 A1 * | 4/2013 | Bohner | F01L 1/46 123/90.15 |
| 2016/0230896 A1 * | 8/2016 | Godbillon | B60T 8/363 |

FOREIGN PATENT DOCUMENTS

| | | | | |
|---|---|---|---|---|
| DE | 10342156 A1 * | 6/2004 | | B60T 17/04 |
| DE | 102005014100 A1 | 2/2006 | | |
| DE | 102005048880 A1 * | 3/2007 | | B60T 8/363 |
| DE | 102012206282 A1 | 11/2012 | | |
| DE | 102011087896 A1 | 6/2013 | | |
| DE | 102013204973 A1 * | 9/2014 | | F16K 27/029 |
| DE | 102013204973 A1 | 9/2014 | | |
| DE | 102013216568 A1 * | 2/2015 | | F16K 27/029 |
| DE | 102014209317 A1 * | 11/2015 | | B01D 29/11 |
| DE | 102017206639 A1 * | 10/2018 | | B01D 29/31 |
| EP | 0108043 A1 * | 5/1984 | | B01D 35/153 |
| GB | 488994 A * | 7/1938 | | F16K 1/32 |
| JP | 2002521643 A | 7/2002 | | |
| KR | 101383020 B1 | 4/2014 | | |
| WO | WO-2012156341 A1 * | 11/2012 | | B60T 8/363 |

OTHER PUBLICATIONS

English translation of Schulz (Year: 2012).*
Korean Notification of Reason for Refusal for Korean Application No. 10-2019-7006882, dated Mar. 31, 2020, with translation, 11 pages.
German Search Report for German Application No. 10 2017 209 582.2, with partial trannslation, dated Feb. 8, 2018—9 pages.
International Search Report and Written Opinion for Application No. PCT/EP2017/072148, dated Nov. 16, 2017—9 pages.
Chinese Office Action for Chinese Application No. 201780057943.X, dated Oct. 10, 2020, 6 pages.
Chinese Office Action for Chinese Application No. 201780057943.X, dated Jul. 14, 2021 with translation, 12 pages.

* cited by examiner

SOLENOID VALVE, IN PARTICULAR FOR SLIP-CONTROLLED MOTOR-VEHICLE BRAKE SYSTEMS

CROSS REFERENCE TO RELATED APPLICATIONS

This application is the U.S. National Phase Application of PCT International Application No. PCT/EP2017/072148, filed Sep. 5, 2017, which claims priority to German Patent Application No. 10 2017 209 582.2, filed Jun. 7, 2017, and German Patent Application No. 10 2016 218 330.3, filed Sep. 23, 2016, the contents of such applications being incorporated by reference herein.

FIELD OF THE INVENTION

The invention relates to an electromagnetic valve, in particular for slip-controlled motor vehicle brake systems.

BACKGROUND OF THE INVENTION

DE 10 2012 206 282 A1, incorporated herein by reference, has already disclosed an electromagnetic valve of the stated type, having a valve closing element which is arranged in a valve housing and which is capable of opening or closing a valve passage in the valve housing, having a magnet armature for actuating the valve closing element, which is designed to be relatively movable within the range of a defined working stroke, having a restoring spring which acts on the magnet armature, and having a preferably block-shaped valve carrier in whose valve holding bore the valve housing and a filter element are introduced, the latter establishing along the shortest route a hydraulic connection between an inlet duct and an outlet duct which open out into the valve holding bore. As a result of the selected direct flow guidance, undesirable flow noises can be generated.

SUMMARY OF THE INVENTION

An aspect of the invention is an inexpensive design of an electromagnetic valve of the stated type with the simplest possible functional means, and an improved electromagnetic valve such that undesirable flow noises are avoided.

BRIEF DESCRIPTION OF THE DRAWINGS

Further features and advantages of aspects of the invention will emerge below from the description of several drawings.

In the drawings.

DETAILED DESCRIPTION OF THE PREFERRED EMBODIMENTS

Figure 1:
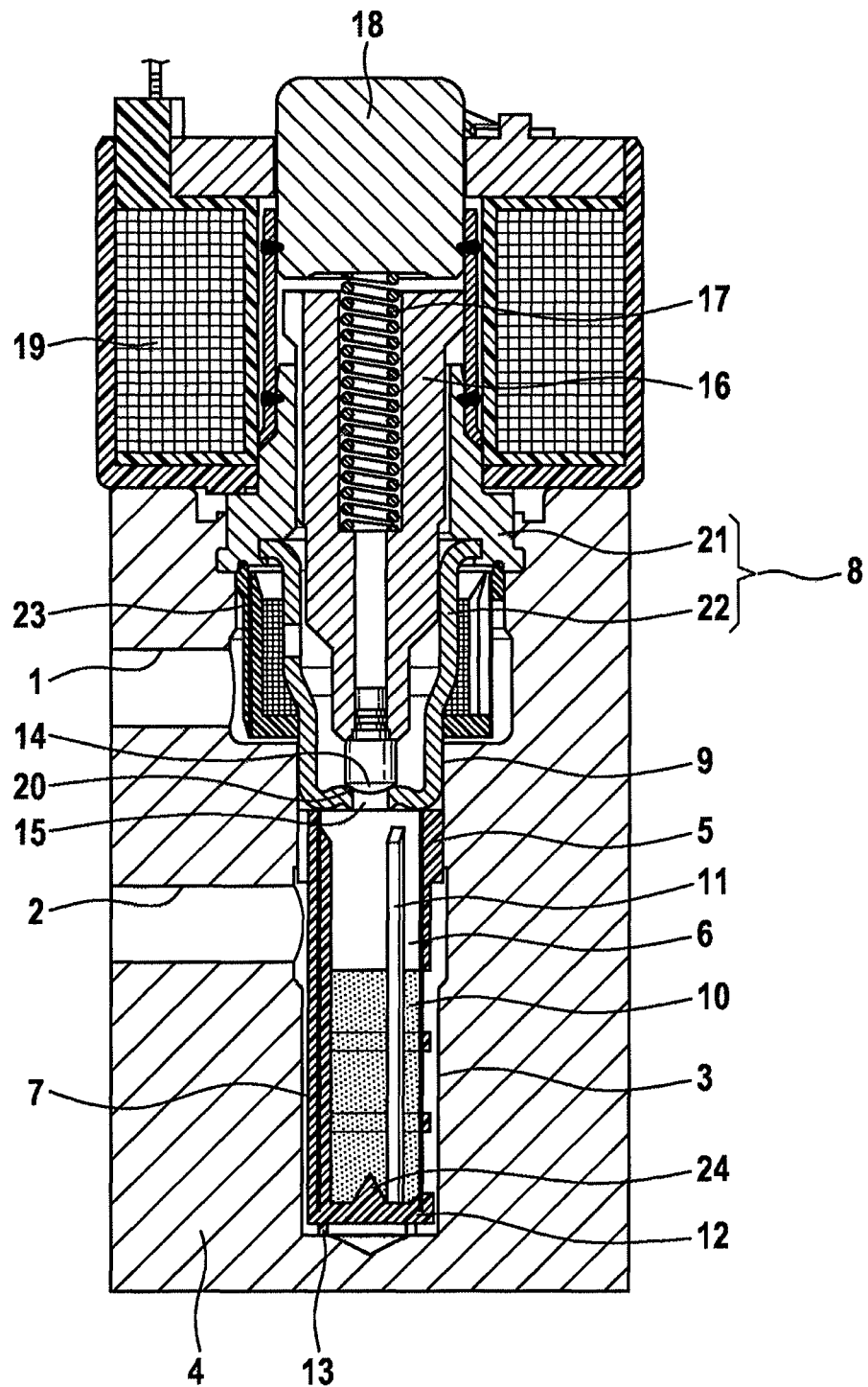
FIG. 1 shows an electromagnetic valve in a longitudinal section, having an arrangement and configuration according to an aspect of the invention of a filter element in a valve holding bore.

FIG. 1 shows an electromagnetic valve which is preferably used for slip-controlled motor vehicle brake systems. The electromagnetic valve consists of functional elements which are known per se. These include a valve closing element 14 which is arranged in a valve housing 8 and which is capable of opening or closing a valve passage 15, a magnet armature 16 for actuating the valve closing element 14, which is designed to be relatively movable within the range of a defined working stroke, and a restoring spring 17 acting on the magnet armature 16, that spring end of which spring which is averted from the magnet armature 16 being supported against a magnet core 18 in the valve housing 8. Furthermore, a magnet coil 19 for the excitation of the magnet armature 16 is situated on the valve housing 8.

The electromagnet valve is closed in the position of no electromagnetic excitation, for which purpose the restoring spring 17, arranged above the magnet armature 16, pushes the valve closing element 14, connected to the magnet armature 16, onto the valve seat 20, whereby the valve passage 15 in the valve seat 20 is blocked.

In the present exemplary embodiment, the magnet core 18 is, as a closure plug, pressed into an austenitic housing portion of the valve housing 8, which housing portion is, as a thin-walled sleeve part, welded to a thick-walled tube body 21. It goes without saying that, if desired or required, other embodiments of the upper housing portion are also possible.

In the present exemplary embodiment, the valve housing 8 consists of the sleeve part carrying the magnet core 18, the thick-walled tube body 21, which is fixed in the valve carrier 4, and a pot-shaped sleeve 22, which is connected fixedly to the tube body 21 and which has the valve passage 15 in the pot base. The sleeve 22 preferably consists of a hardened ferritic material in order for it to be possible for the valve seat 20, which is manufactured in a deep-drawing process, to be designed to be as free from wear as possible.

As emerges clearly from FIG. 1, the pot-shaped sleeve 22 is adjoined by a filter element 5 in the axial direction of the valve housing. Said filter element makes possible a simple, cost-effective measure for outlet-side filtering of the electromagnetic valve, without significant structural changes to the electromagnetic valve, in particular to the valve housing 8 thereof, having to be made.

As per the electromagnetic valve according to FIG. 1, for this purpose, the rod-shaped filter element 5 is, according to an aspect of the invention, braced in a particularly simple manner between the sleeve 22 of the valve housing 8 and the base of the valve holding bore 3. A further annular filter element 23 surrounds the valve housing 8 in the region of the pot-shaped sleeve 22 in order to ensure a contamination-free hydraulic supply between an inlet duct 1, which opens out into the valve carrier 4 transversely with respect to the electromagnetic valve, and the valve inlet, which is formed in the sleeve 22.

According to an aspect of the invention, for targeted flow diversion within the valve holding bore 3, both the inlet and outlet ducts 1, 2 are oriented transversely with respect to the valve holding bore 3 in the valve carrier 4, wherein the outlet duct 2 opens out, at a distance from the discharge of the filter element 5, into a portion of the valve holding bore 3 in which the filter element 5 has a closed sleeve portion 6.

In terms of construction, the discharge region of the filter element 5 is arranged between the closed sleeve portion 6 and the base of the valve holding bore 3, said discharge region being provided with a fine filter fabric 10. For the purpose of fixing and supporting the fine filter fabric 10, the sleeve portion 6 has multiple webs 11 or ribs in the axial direction, wherein, along the webs 11, the fine filter fabric 10 forms a lateral surface for radial discharge from the filter element 5.

Since an annular space 7 is provided between the filter element 5 and the valve holding bore 3 and extends from the base of the valve holding bore 3 to a sealing region 9 formed on the pot-shaped sleeve 22 of the valve housing 8, in the position lifted off from the valve seat 20 of the valve closing element 14, the pressure medium stream firstly passes, within the closed sleeve portion 6, to the fine filter fabric 10 in a vertically directed manner and, there, following radial discharge, impinges on the wall of the valve holding bore 3, whereby the flow is diverted vertically upward via the annular space 7 and, at the height of the sleeve portion 6, undergoes a horizontal direction reversal in the direction of the outlet duct 2. Thus, as a result of the covering of the outlet duct 2 and the dimensioning of the annular space 7, the sleeve portion 6 on the rod-shaped filter element 5 brings about a homogenization of the flow at the outlet of the electromagnetic valve with the effect that no locally occurring, very high flow speeds, which incite vibration in adjoining lines and are consequently perceived acoustically, are observed.

Figure 2:
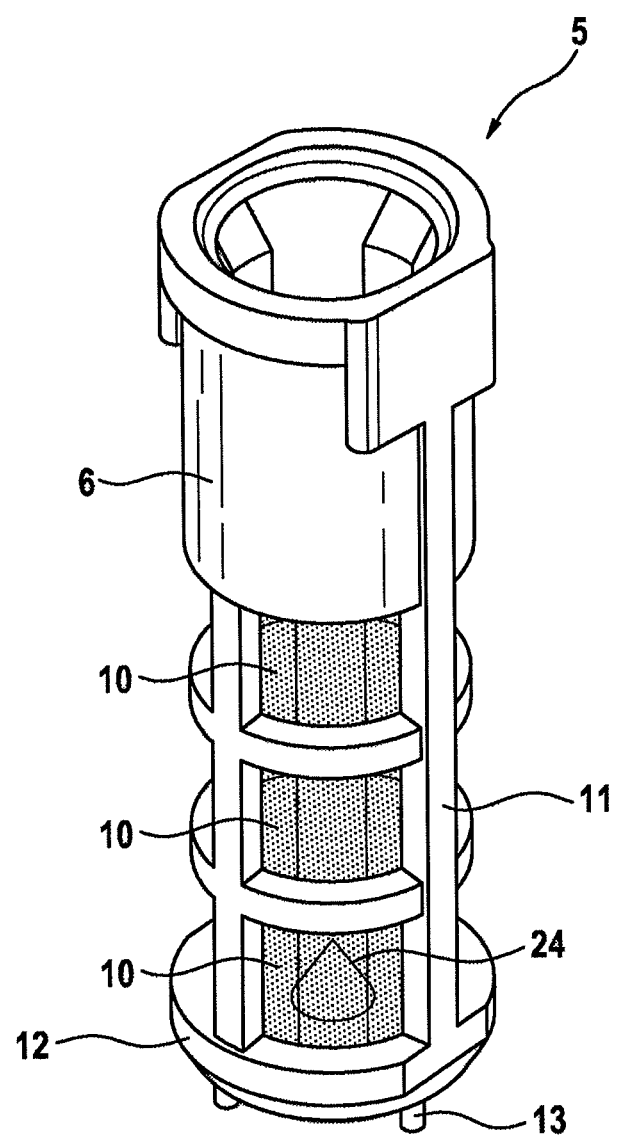
FIG. 2 shows the filter element according to FIG. 1 in a perspective view.

FIG. 2 shows, in a perspective view, the filter element 5, which is produced from a plastic and in whose web region the fine filter fabric 10 is injected. That end of the filter element 5 which is averted from the sleeve portion 6 is formed by a disk 12 which is connected to the webs 11, said webs being distributed over the circumference of the filter element 5, for which purpose an injection-molding process may be used for production. Preferably, on the end side averted from the web region, the disk 12 is provided with multiple nubs 13 which, as per FIG. 1, are supported against the base of the valve holding bore 3. For optimizing the flow profile, the disk 12 has, centrally, a cone 24 which is directed into the interior of the filter element 5 such that, for uniform flow through the fine filter fabric 10, a hydraulic stream impinging vertically on the disk 12 in the interior of the filter element 5 is diverted radially outward. Said cone 24 is illustrated once again in FIG. 1 based on a longitudinal section through the disk 12.

The filter element 5 is distinguished by a slender design which, in the region of the fine filter fabric 10, has particularly low resistance in terms of flow, wherein, as a result of its complete coverage of the outlet duct, the sleeve portion 6 situated in front of the fine filter fabric 10 reliably prevents a direct (short-circuit) hydraulic stream in the direction of the outlet duct 2.

LIST OF REFERENCE SIGNS

1 Inlet duct
2 Outlet duct
3 Valve holding bore
4 Valve carrier
5 Filter element
6 Sleeve portion
7 Annular space
8 Valve housing
9 Sealing region
10 Fine filter fabric
11 Web
12 Disk
13 Nubs
14 Valve closing element
15 Valve passage
16 Magnet armature
17 Restoring spring
18 Magnet core
19 Magnet coil
20 Valve seat
21 Tube body
22 Sleeve
23 Annular filter element
24 Cone

The invention claimed is:

1. An electromagnetic valve, for slip-controlled motor vehicle brake systems, comprising:
   a valve housing having a valve passage;
   a valve closing element which is arranged in the valve housing and which is capable of opening or closing the valve passage in the valve housing,
   a magnet armature for actuating the valve closing element, which is relatively movable within a range of a defined working stroke,
   a restoring spring which acts on the magnet armature,
   a block-shaped valve carrier in whose valve holding bore the valve housing and a filter element are introduced, the valve holding bore extending in an axial direction, and
   an inlet duct and an outlet duct which open out into the valve holding bore,
   wherein both the inlet and outlet ducts are oriented transversely with respect to the valve holding bore in the valve carrier, and wherein the outlet duct opens out, at a distance from a discharge of the filter element, into a portion of the valve holding bore in which the filter element has a closed sleeve portion, the closed sleeve portion extending around an entire circumference of the filter element, and further extending within the valve holding bore along an entire axial distance covered by an opening of the outlet duct, and wherein an annular space is provided between the filter element and the valve holding bore and extends from a base of the valve holding bore to a sealing region formed on the valve housing, and
   wherein the discharge of the filter element is formed in a radial surface of the filter element and opens into the annular space on a side of the valve holding bore opposite the outlet duct.

2. The electromagnetic valve as claimed in claim 1, wherein the sealing region is fixed by a press fit in the valve carrier.

3. The electromagnetic valve as claimed in claim 1, wherein, the discharge of the filter element is arranged between the closed sleeve portion and the base of the valve holding bore and is provided with a fine filter fabric.

4. The electromagnetic valve as claimed in claim 3, wherein, for fixing and supporting the fine filter fabric, the sleeve portion has multiple webs or ribs positioned axially below the closed sleeve portion.

5. The electromagnetic valve as claimed in claim 4, wherein, along the webs, the fine filter fabric forms the radial surface for radial discharge from the filter element.

6. The electromagnetic valve as claimed in claim 4, wherein an end of each web which is averted from the sleeve portion is fixed to a disk which makes contact with the base of the valve holding bore via nubs.

7. The electromagnetic valve as claimed in claim 1, wherein an axial end of the closed sleeve portion comprises a disk which is spaced from the base of the valve holding bore, the annular space communicating with the space between the disk and the base of the valve holding bore.

8. The electromagnetic valve as claimed in claim 7, wherein the disk makes contact with the base of the valve holding bore via nubs that form the space between the disk and the base of the valve holding bore.

* * * * *